US012615446B2

(12) United States Patent
Ollila

(10) Patent No.: US 12,615,446 B2
(45) Date of Patent: Apr. 28, 2026

(54) HALLUCINATING COLOUR FILTER ARRAY ON IMAGE SENSOR CHIP

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 38 days.

(21) Appl. No.: 18/751,526

(22) Filed: Jun. 24, 2024

(65) Prior Publication Data

US 2025/0392833 A1      Dec. 25, 2025

(51) Int. Cl.
| | |
|---|---|
| *H04N 25/13* | (2023.01) |
| *G06F 3/01* | (2006.01) |
| *H04N 23/84* | (2023.01) |
| *H04N 23/951* | (2023.01) |
| *H04N 25/443* | (2023.01) |
| *H04N 25/46* | (2023.01) |

(52) U.S. Cl.
CPC ........... *H04N 25/134* (2023.01); *G06F 3/013* (2013.01); *H04N 23/84* (2023.01); *H04N 23/951* (2023.01); *H04N 25/443* (2023.01); *H04N 25/46* (2023.01)

(58) Field of Classification Search
CPC .... H04N 25/134; H04N 23/84; H04N 23/951; H04N 25/443; H04N 25/46; G06F 3/013
See application file for complete search history.

(56) References Cited

U.S. PATENT DOCUMENTS

| | | | | |
|---|---|---|---|---|
| 2012/0262610 A1* | 10/2012 | Rissa | ...................... | H04N 23/84 348/E9.003 |
| 2015/0077597 A1* | 3/2015 | Furuta | .................... | H04N 23/12 348/242 |
| 2017/0069252 A1* | 3/2017 | Guo | ...................... | G09G 3/2074 |
| 2020/0211229 A1* | 7/2020 | Hwang | ...................... | G06T 3/06 |
| 2021/0224964 A1* | 7/2021 | Narukiyo | ................. | G06N 3/08 |
| 2022/0215588 A1* | 7/2022 | Hwang | ................. | G06T 3/4046 |
| 2022/0394219 A1* | 12/2022 | Jang | ...................... | H04N 23/843 |
| 2023/0153966 A1* | 5/2023 | Narukiyo | ............. | H04N 1/6066 382/159 |
| 2023/0388623 A1* | 11/2023 | Hwang | ................. | H04N 23/80 |
| 2024/0087653 A1* | 3/2024 | Kale | ..................... | G11C 7/1006 |
| 2024/0089632 A1* | 3/2024 | Kale | ..................... | H10F 39/809 |
| 2024/0147090 A1* | 5/2024 | Im | ........................... | H04N 25/00 |
| 2024/0223917 A1* | 7/2024 | Ki | ............................. | H04N 9/78 |
| 2025/0080863 A1* | 3/2025 | Cui | ........................ | H04N 23/84 |

* cited by examiner

*Primary Examiner* — Chiawei Chen
(74) *Attorney, Agent, or Firm* — Ziegler IP Law Group, LLC.

(57) ABSTRACT

An imaging system has an image sensor chip and processor (s). The image sensor chip has a photo-sensitive surface with photo-sensitive cells; a colour filter array with physical smallest repeating units, wherein a given physical smallest repeating unit has array(s) of a first type of colour filters, array(s) of a second type of colour filters, and array(s) of a third type of colour filters; and a controller configured to employ neural network(s) during read out of image data. The processor(s) is/are configured to: receive output image data, wherein a smallest repeating unit in a colour pattern of at least a part of the output image data is different from the given physical smallest repeating unit; and generate an output image.

15 Claims, 5 Drawing Sheets

202c

202d

302

402a

404a — 406a
408a — 404b

402b

404c — 406b
408b — 404d

HALLUCINATING COLOUR FILTER ARRAY ON IMAGE SENSOR CHIP

TECHNICAL FIELD

The present disclosure relates to imaging systems incorporating hallucinating colour filter arrays (CFAs) on image sensor chips. The present disclosure also relates to methods incorporating hallucinating CFAs on image sensor chips.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, design, medical imaging operations, simulators, navigation, and the like. Several advancements are being made to develop image generation technology.

However, existing image generation technology has several limitations associated therewith. Firstly, the existing image generation technology is not well-compatible with different types of colour filter arrays (CFAs). In other words, an image processing pipeline (ISP) used by the existing image generation technology (for processing image data read out from image sensor) does not support most types of CFAs other than, for example, such as a standard Bayer CFA. Due to this, employing image signal processes on said image data is time-consuming and computationally-intensive, as considerable changes are required to performed in existing software/firmware algorithms corresponding to said image signal processes; and the (same) existing software/firmware algorithms cannot be used for the different types of CFAs. In an example, for some Bayer CFAs (for example, such as a quad-Bayer CFA, a nona-Bayer CFA, a hexadeca-Bayer CFA, or the like), and some non-Bayer CFAs (for example, such as a Red-Green-Blue-Infrared (RGBIR)-based CFA, a Red-Green-Blue-White (RGBW)-based CFA, a Red-Clear-Clear-Blue (RCCB)-based CFA, or the like), there are very few demosaicking algorithms that are supported by these CFAs and very limited ISPs are supported by these CFAs.

Secondly, existing equipment and techniques for image generation are inefficient in terms of generating images that have an acceptably high visual quality (for example, in terms of high resolution) throughout a wide field of view. This is because processing of image signals captured by pixels of an image sensor requires considerable processing resources, involves a long processing time, requires high computing power, and limits a total number of pixels that can be arranged on an image sensor for full pixel readout at a given frame rate. As an example, image signals corresponding to only about 10 million pixels on the image sensor may be processed currently (by full pixel readout) to generate image frames at 90 frames per second (FPS). Therefore, the existing equipment and techniques are not well-suited for generating such high visual quality images along with fulfilling other requirements in XR devices, for example, such as a high resolution (such as a resolution higher than or equal to 60 pixels per degree), a small pixel size, a large field of view, and a high frame rate (such as a frame rate higher than or equal to 90 FPS).

Therefore, in light of the foregoing discussion, there exists a need to overcome the aforementioned drawbacks.

SUMMARY

The present disclosure seeks to provide an imaging system and a method to generate high-quality, realistic output images at a high framerate, by way of utilising neural network(s) for generating output image data according to a colour pattern that is different from a physical colour filter array of an image sensor chip. The aim of the present disclosure is achieved by an imaging system and a method which incorporate hallucinating colour filter array on image sensor chip, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 4A illustrates how subsampling is employed when reading out image data from a first region of a photo-sensitive surface of an image sensor chip, while

DETAILED DESCRIPTION OF EMBODIMENTS

Figures 1A, 1B, 1C:
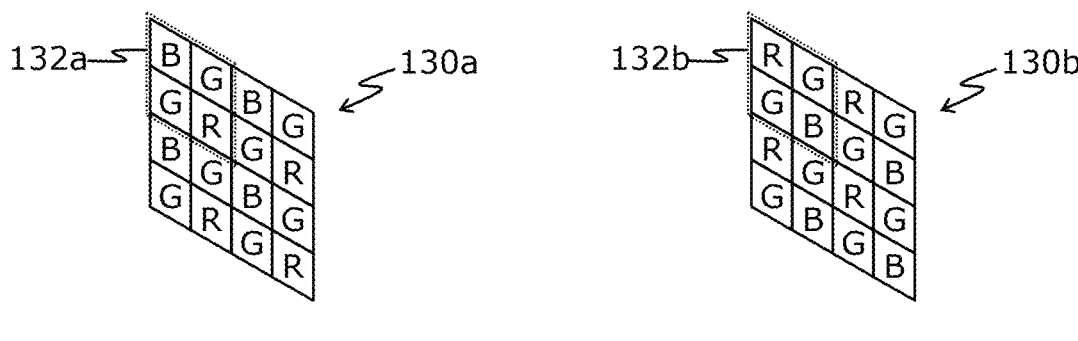
FIG. 1A illustrates a simplified example implementation of an imaging system incorporating hallucinating colour filter arrays on image sensor chips, in accordance with an embodiment of the present disclosure.
FIGS. 1B, 1C, 1D, 1E and 1F illustrate various different examples of a colour pattern according to which at least a part of output image data is to be generated by at least one neural network, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

an image sensor chip comprising:

a photo-sensitive surface comprising a plurality of photo-sensitive cells;

a colour filter array arranged on an optical path of the photo-sensitive surface, the colour filter array comprising a plurality of physical smallest repeating units, wherein a given physical smallest repeating unit comprises at least one array of a first type of colour filters that allow at least one first wavelength lying in a first wavelength range to pass through, at least one array of a second type of colour filters that allow at least one second wavelength lying in a second wavelength range to pass through, and at least one array of a third type of colour filters that allow at least one third wavelength lying in a third wavelength range to pass through; and a controller configured to employ at least one neural network during read out of image data from a subset of the plurality of photo-sensitive cells; and at least one processor configured to:

receive, from the controller, output image data generated by the at least one neural network, the output image data being in a RAW image format, wherein a smallest repeating unit in a colour pattern of at least a part of the output image data is different from the given physical smallest repeating unit in the colour filter array of the image sensor chip; and perform a sequence of image signal processes on the output image data to generate an output image.

In a second aspect, an embodiment of the present disclosure provides a method comprising:

receiving, from a controller, output image data generated by at least one neural network, the output image data being in a RAW image format, wherein a smallest repeating unit in a colour pattern of at least a part of the output image data is different from a given physical smallest repeating unit in a colour filter array of an image sensor chip, wherein the image sensor chip comprises: a photo-sensitive surface comprising a plurality of photo-sensitive cells; the colour filter array arranged on an optical path of the photo-sensitive surface, the colour filter array comprising a plurality of physical smallest repeating units, wherein the given physical smallest repeating unit comprises at least one array of a first type of colour filters that allow at least one first wavelength lying in a first wavelength range to pass through, at least one array of a second type of colour filters that allow at least one second wavelength lying in a second wavelength range to pass through, and the at least one array of a third type of colour filters that allow at least one third wavelength lying in a third wavelength range to pass through; and the controller configured to employ the at least one neural network during read out of image data from a subset of the plurality of photo-sensitive cells.

performing a sequence of image signal processes on the output image data to generate an output image.

The present disclosure provides the aforementioned imaging system and the aforementioned method incorporating hallucinating colour filter array on the image sensor chip, to generate high-quality, realistic output images at a high framerate, by way of utilising the at least one neural network for generating the output image data according to the colour pattern that is different from a physical colour filter array (CFA) of the image sensor chip. When at least said part of the output image data by the at least one neural network according to the colour pattern, it facilitates in performing the sequence of image signal processes on at least said part of the output image data in a time-efficient and computationally-efficient manner, thereby generating high-quality, realistic output images at a high framerate with accurate colour reproduction. This is because said colour pattern is well-supported by (namely, is well-compatible or suitable with) the image signal processes of said sequence, as compared to any type of the CFA. Thus, image signal processes can be easily and efficiently performed by the at least one processor, without requiring any changes in existing hardware (for example, such as an image signal processing chip) and/or existing software/firmware algorithms corresponding to said image signal processes, which otherwise would have been required when the output image data is to be generated according to the CFA only. Furthermore, a selective read out of the image data facilitates in providing a high frame rate of output images, whilst reducing computational burden, delays, and excessive power consumption. The imaging system and the method are susceptible to cope with visual quality requirements, for example, such as a high resolution (such as a resolution higher than or equal to 60 pixels per degree), a small pixel size, and a large field of view, whilst achieving a high and controlled frame rate (such as a frame rate higher than or equal to 90 frames per second (FPS)). The imaging system and the method are simple, robust, fast, reliable, support real-time hallucination of CFAs on image sensor chips, and can be implemented with ease.

Throughout the present disclosure, the term "image sensor chip" refers to a semiconductor chip comprising an image sensor. It will be appreciated that the image sensor chip may, for example, be made up of a silicon material. Herein, the term "image sensor" refers to a device that detects light from a real-world environment at the plurality of photo-sensitive cells (namely, a plurality of pixels) to capture a plurality of image signals. The plurality of image signals are electrical signals pertaining to a real-world scene of the real-world environment. The plurality of image signals constitute the image data of the plurality of photo-sensitive cells. Herein, the term "image data" refers to information pertaining to a given photo-sensitive cell of the image sensor chip, wherein said information comprises one or more of: a colour value of the given photo-sensitive cell, a transparency value of the given photo-sensitive cell, a luminosity value of the given photo-sensitive cell. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Examples of the image sensor include, but are not limited to, a charge-coupled device (CCD) image sensor, and a complementary metal-oxide-semiconductor (CMOS) image sensor. It will be appreciated that the plurality of photo-sensitive cells could, for example, be arranged in a rectangular two-dimensional (2D) grid, a polygonal arrangement, a circular arrangement, an elliptical arrangement, a freeform arrangement, or the like, on the photo-sensitive surface. In an example, the image sensor chip may comprise 25 million photo-sensitive cells (namely, 25 megapixels) arranged in the rectangular 2D grid (such as a 5000×5000 grid) on the photo-sensitive surface. Image sensor chips and image sensors are well-known in the art.

Optionally, the image sensor chip is a part of a camera that is employed to capture image(s). Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. Optionally, the camera is implemented as a combination of the visible-light camera and the depth camera.

Throughout the present disclosure, the term "colour filter array" refers to a physical pattern of colour filters arranged in front of the plurality of photo-sensitive cells of the photo-sensitive surface, wherein the colour filter array (CFA) allows only specific wavelengths of light to pass through a given colour filter to reach a corresponding photo-sensitive cell of the photo-sensitive surface, for capturing corresponding image data. Colour filter arrays are well-known in the art.

Notably, the given physical smallest repeating unit of the CFA is a smallest grid of colour filters that is repeated throughout the CFA. In other words, the given physical smallest repeating unit may be understood as a building block that gets repeated (for example, horizontally and/or vertically) to form an entirety of the CFA. The given physical smallest repeating unit may, for example, be an M×N array of colour filters. In an example, for sake of better understanding and clarity, a given portion of the CFA may comprise 4 physical smallest repeating units arranged in a 2×2 array, wherein a given physical smallest repeating unit from amongst the 4 physical smallest repeating units is a 6×6 array of colour filters. In such an example, the given physical smallest repeating unit comprises 36 colour filters, and the CFA comprises a total of 144 colour filters. Such a CFA has been also illustrated in conjunction with FIG. 1A, for sake of better understanding.

It will be appreciated that the CFA could be a Bayer CFA or a non-Bayer CFA. The Bayer CFA could, for example, be a 4C Bayer CFA (also referred to as "quad-Bayer CFA" or "tetra-Bayer CFA", wherein an array of 2×2 photo-sensitive cells corresponds to a same colour filter), a 9C Bayer CFA (also referred to as "nona-Bayer CFA", wherein an array of 3×3 photo-sensitive cells corresponds to a same colour filter), a 16C Bayer CFA (also referred to as "hexadeca-Bayer CFA", wherein an array of 4×4 photo-sensitive cells corresponds to a same colour filter), or similar. The non-Bayer CFA could be a Cyan-Magenta-Yellow (CMY)-based CFA, a Red-Yellow-Yellow-Blue (RYYB)-based CFA, or similar. Bayer CFAs and non-Bayer CFAs are well-known in the art.

In an example, for a Red-Green-Blue (RGB)-based implementation, the at least one array of the first type of colour filters may be at least one array of a green-type of colour filters, the at least one array of the second type of colour filters may be at least one array of a red-type of colour filters, the at least one array of the third type of colour filters may be at least one array of a blue-type of colour filters. In this regard, the first wavelength range (that corresponds to the green-type of colour filters) may be from 480 nanometres (nm) to 580 nm, the second wavelength range (that corresponds to the red-type of colour filters) may be from 580 nm to 700 nm, and the third wavelength range (that corresponds to the blue-type of colour filters) may be from 400 nm to 480 nm. The aforesaid wavelength ranges may also overlap with each other.

In another example, for a Cyan-Magenta-Yellow (CMY)-based implementation, the at least one array of the first type of colour filters may be at least one array of a cyan-type of colour filters, the at least one array of the second type of colour filters may be at least one array of a magenta-type of colour filters, the at least one array of the third type of colour filters may be at least one array of a yellow-type of colour filters. In this regard, the first wavelength range (that corresponds to the cyan-type of colour filters) may be from 490 nm to 520 nm, the second wavelength range (that corresponds to the magenta-type of colour filters) may be from 600 nm to 660 nm, and the third wavelength range (that corresponds to the yellow-type of colour filters) may be from 570 nm to 590 nm. The aforesaid wavelength ranges may also overlap with each other.

In yet another example, for a Red-Yellow-Yellow-Blue (RYYB)-based implementation, the at least one array of the first type of colour filters may be at least one array of a red-type of colour filters, the at least one array of the second type of colour filters may be at least one array of a yellow-type of colour filters, the at least one array of the third type of colour filters may be at least one array of a blue-type of colour filters. In this regard, the first wavelength range (that corresponds to the red-type of colour filters) may be from 580 nm to 700 nm, the second wavelength range (that corresponds to the yellow-type of colour filters) may be from 570 nm to 590 nm, and the third wavelength range (that corresponds to the blue-type of colour filters) may be from 400 nm to 480 nm. The aforesaid wavelength ranges may also overlap with each other.

For all the aforesaid examples, at least one array of a given type of colour filters could, for example, be a 2×2 array of the given type of colour filters, a 3×3 array of the given type of colour filters, a 4×4 array of the given type of colour filters, or similar. Herein, the term "given type of colour filters" encompasses at least one of: the first type of colour filters, the second type of colour filters, the third type of colour filters. Moreover, it may be noted that there could be a same shade of a given colour in the given type of colour filters, or different shades of a given colour in the given type of colour filters. For example, in case of the blue-type of colour filters, there could be different shades of a blue colour in the blue-type of colour filters.

Throughout the present disclosure, the term "controller" refers to a component that is capable of at least employing the at least one neural network to generate the output image data according to the colour pattern, said colour pattern having the smallest repeating unit that is different from the given physical smallest repeating unit of the CFA.

It will be appreciated that when the image data is read out from the subset of the plurality of photo-sensitive cells, it means that the controller selectively reads out the image data, i.e., image data corresponding to only some photo-sensitive cells is read out, instead of reading out an entirety of photo-sensitive cells of the photo-sensitive surface. Thus, when selectively reading out the image data (namely, when performing subsampling), image signals captured by only some photo-sensitive cells of the photo-sensitive surface are processed. Optionally, when the plurality of photo-sensitive cells are arranged in the rectangular 2D grid on the photo-sensitive surface of the image sensor chip, the controller is configured to read out the image data in a line-by-line manner. It will be appreciated that such a selective read out of the image data facilitates in providing a high frame rate of output images (that are generated upon processing the output image data). This is because a processing time for selectively reading out the image data and generating unread image data of remaining photo-sensitive cells of the photo-sensitive surface using the (read-out) image data, is considerably lesser as compared to a processing time for reading out image data from each and every photo-sensitive cell of the photo-sensitive surface. Such a frame rate may, for example, be 60 FPS, 90 FPS, 120 FPS, or higher.

Optionally, the controller is configured to:

read out the image data from the image sensor chip, by:

(i) selectively skipping read out from those photo-sensitive cells in at least a region of the photo-sensitive surface that correspond to: at least one colour filter in at least one array of the first type of colour filters, at least one colour filter in at least one array of the second type of colour filters, and at least one colour filter in at least one array of the third type of colour filters, of the given physical smallest repeating unit; and (ii) reading out from those photo-sensitive cells in at least the region of the photo-sensitive surface that correspond to: remaining colour filters in the at least one array of the first type of colour filters, remaining colour filters in the at least one array of the second type of colour filters, and remaining colour filters in at least one array of the third type of colour filters, of a given physical smallest repeating unit; and provide said image data as an input to the at least one neural network.

In this regard, when the controller employs the subsampling in at least the region of the photo-sensitive surface, the image data is selectively read out from at least said region of the photo-sensitive surface. In particular, for the given physical smallest repeating unit, the at least one processor reads out those photo-sensitive cells that correspond to: one or more colour filters in the at least one array of the first type of colour filters, one or more colour filters in the at least one array of the second type of colour filters, and one or more colour filters in the at least one array of the third type of colour filters. In addition to this, the controller does not read out (namely, skips) those photo-sensitive cells that correspond to the remaining colour filters in the at least one array of the first type of colour filters, the remaining colour filters in the at least one array of the second type of colour filters, and the remaining colour filters in the at least one array of the third type of colour filters. Reading out the image data in a subsampled manner is well-known in the art. For example, when the CFA is a nona-Bayer CFA, the at least one processor may read out image data from 20 photo-sensitive cells that correspond to: 10 colour filters in two arrays of the first type of colour filters (for example, a green-type of colour filters), 5 colour filters in one array of the second type of colour filters (for example, a blue-type of colour filters), and 5 colour filters in one array of the third type of colour filters (for example, a red-type of colour filters).

It will be appreciated that said region of the photo-sensitive surface could, for example, be a gaze region in the photo-sensitive surface or a peripheral region in the photo-sensitive surface (as discussed later in detail). Optionally, in this regard, the at least one processor is configured to: obtain gaze information indicative of a gaze direction of a user; and determine said region in the photo-sensitive surface of the image sensor chip, based on the gaze direction (as discussed later in detail). It will also be appreciated that preferably, such a selective read out of the image data (namely, subsampling) could be employed only in the peripheral region, and a full sampling is employed in the gaze region, since pixels in the output image (namely, a portion of the output image) that correspond to the gaze region would be perceived with high visual acuity by a fovea of the user's eye, as compared to pixels in the output image (namely, another portion of the output image) that correspond to the peripheral region. This means only some photo-sensitive cells are read out from the peripheral region, whereas (almost) each photo-sensitive cell is read out from the gaze region. As a result, better colour reproduction is obtained for a (gaze-contingent) portion of the output image that correspond to the gaze region, whilst providing a high frame rate of output images. In some cases, the subsampling could be performed both in the gaze region and the peripheral region. It will be appreciated that the subsampling may be performed in a manner that a resolution of the gaze-contingent portion of the output image and a resolution of the another portion (namely, a non-gaze-contingent) of the output image would match better and a transition (namely, border) between the gaze-contingent portion and the another portion would be imperceptible (namely, unnoticeable) to the user viewing the output image.

Furthermore, optionally, the input of the at least one neural network comprises said (subsampled) image data, and an output of the at least one neural network comprises the output image data, upon processing said image data. It will be appreciated that when processing the image data, the at least one neural network utilises the colour pattern (that is different from a colour pattern in the CFA) and performs interpolation and demosaicking operations on the image data, to generate the output image data. Thus, the at least one neural network can efficiently utilise even incomplete (i.e., subsampled) image data to generate the output image data that is accurate and realistic. For this, the at least one neural network may perform the interpolation and/or the demosaicking (as and when required) in a highly accurate manner, as compared to conventional techniques for performing the interpolation and/or the demosaicking. The interpolation and the demosaicking are well-known in the art. Optionally, the input of the at least one neural network further comprises resolution information indicative of a resolution (for example, such as in terms of pixels per degree) of said image data. However, when it is already known to the at least one neural network that the controller reads out said image data at a particular resolution, the aforesaid resolution information may not be required to be provided as the input each time.

Optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN), a diffusion-based neural network, a deep-unfolding neural network.

Optionally, the controller is configured to employ binning when reading out from neighbouring photo-sensitive cells in at least said region of the photo-sensitive surface that correspond to colour filters of a same type. In this regard, when reading out the image data from at least said region of the photo-sensitive surface, the neighbouring photo-sensitive cells (corresponding to the colour filters of the same type (namely, a same colour)) are binned (namely, combined) together to form a single super photo-sensitive cell. Beneficially, this enables in reducing a noise in a corresponding region of the output image (that is generated upon processing said image data), for example, due to averaging. This may, particularly, be beneficial when said region of the photo-sensitive surface is the peripheral region in the photo-sensitive surface, because the noise is typically more perceivable in a peripheral region of any image, as compared to a gaze region of said image. The aforesaid binning may also facilitate in reducing an overall time of reading out the image data from the image sensor chip, and in increasing a frame rate of displaying output images. Even when the binning is performed for the neighbouring photo-sensitive cells that correspond to the colour filters of the same type, the single super photo-sensitive cell would have a wide range spectral colour in at least said region, thereby potentially improving colour reproduction thereat. It will be appreciated that the aforesaid binning of the neighbouring photo-sensitive cells could be an analog binning (i.e., binning that is performed at a time of reading out the image data from the image sensor chip), or a digital binning (i.e., binning that is performed after the image data has been read out from the image sensor chip). The analog binning typically has a benefit of providing a faster framerate and a minimal noise in reading out the image data. Binning process and its techniques/algorithms are well-known in the art.

Optionally, the controller is configured to use at least two different settings pertaining to at least one of: an exposure time, a sensitivity, an aperture size, when reading out from the neighbouring photo-sensitive cells in at least said region of the photo-sensitive surface that correspond to the colour filters of the same type. In this regard, the image data from the neighbouring photo-sensitive cells in at least said region of the photo-sensitive surface is read out using the at least two different settings i.e., using at least one of: different exposure times, different sensitivities, different aperture sizes. The technical benefit of using the at least two different settings for reading out the (subsampled) image data is that it facilitates in generating output images having high dynamic range (HDR) characteristics, without affecting the frame rate of generating the output images negatively. Optionally, when processing the image data that is read out using the at least two different settings, the at least one neural network performs at least one operation on said image data, that provides a result that is similar to applying at least one HDR imaging technique. The at least one HDR imaging technique may, for example, be an HDR tone-mapping technique, an HDR exposure bracketing technique, an HDR exposure fusion technique, a dual ISO technique, an edge-preserving filtering technique (for example, such as a guided image filtering technique). The exposure time, the sensitivity, and the aperture size are well-known in the art.

Throughout the present disclosure, the term "output image data" refers to image data corresponding to the output image, said image data being in the RAW image format. It is to be understood that when the output image data is in the RAW image format, the output image data is unprocessed (or may be minimally processed) when generated by the at least one neural network. The RAW image format is well-known in the art.

Notably, upon reading out the image data, the image data is processed by the at least one neural network (in the controller), to generate the output image data in a manner that at least said part of the output image data is generated according to the colour pattern whose smallest repeating unit is different from the given physical smallest repeating unit in the CFA. Throughout the present disclosure, the term "colour pattern" refers to a digital pattern of colour filters that is to be employed by the at least one neural network for generating at least said part of the output image data. In other words, the colour pattern is not actually or physically present in the image sensor chip, but is only present in a hallucinated manner (i.e., without its physical presence) for facilitating the at least one neural network to generate at least said part of the output image data according to said colour pattern. The smallest repeating unit of the colour pattern is a smallest grid of colour filters that is repeated throughout the colour pattern. The smallest repeating unit of the colour pattern may, for example, be an P×Q array of colour filters. It will be appreciated that an overall size of the smallest repeating unit in the colour pattern is lesser, as compared to an overall size of the given physical smallest repeating unit in the CFA. In an example, the given physical smallest repeating unit in the CFA may be a 6×6 array of colour filters, whereas the smallest repeating unit in the colour pattern may be a 4×4 array of colour filters or a 2×2 array of colour filters. Optionally, the smallest repeating unit in the colour pattern of at least said part of the output image data corresponds to a standard Bayer colour pattern.

In some implementations, a single part of the output image data (which, for example, corresponds to a gaze region in the photo-sensitive surface) is generated according to the colour pattern, while a remaining part of the output image data (which, for example, corresponds to a peripheral region surrounding the gaze region in the photo-sensitive surface) is generated according to the CFA only. In an example, when the CFA is a nona-Bayer CFA, a colour pattern corresponding to the single part of the output image data may be a standard Bayer colour pattern or a quad-Bayer colour pattern, while a colour pattern corresponding to the remaining part of the output image data may still be a nona-Bayer colour pattern. In other implementations, an entirety of the output image data is generated according to the colour pattern. In an example, when the CFA is a nona-Bayer CFA, a colour pattern corresponding to the entirety of the output image data may be a standard Bayer colour pattern or a quad-Bayer colour pattern. In yet other implementations, different parts of the output image data are generated according to different colour patterns (as discussed later in detail). In an example, when the CFA is a nona-Bayer CFA, a colour pattern corresponding to one part of the output image data may be a standard Bayer colour pattern, while a colour pattern corresponding to a remaining part of the output image data may be a quad-Bayer colour pattern.

The technical benefit of generating at least said part of the output image data by the at least one neural network according to the colour pattern is that it facilitates in performing the sequence of image signal processes on at least said part of the output image data in a time-efficient and computationally-efficient manner, thereby generating high-quality, realistic output images at a high framerate with accurate colour reproduction. This is because said colour pattern is well-supported by (namely, is well-compatible or suitable with) the image signal processes of said sequence, as compared to the CFA. Thus, image signal processes can be easily and efficiently performed by the at least one processor, without requiring any changes in existing software/firmware algorithms corresponding to said image signal processes, which otherwise would have been required when the output image data is to be generated according to the CFA only.

Notably, once the output image data is generated by the at least one neural network, the output image data is received by the at least one processor, and the image signal processes are performed on said output image data, for generating the output image. It will be appreciated that the image signal processes in the sequence need not be performed by the at least one processor in any specific order or only in a fixed sequence. Moreover, it may also be possible that some of the image signal processes in said sequence are performed on the output image data, while a remainder of the image signal processes in said sequence are skipped (namely, not performed) by the at least one processor. Optionally, the at least one processor comprises a plurality of hardware blocks, wherein a given hardware block is configured to perform a given image signal process or a processing step of the given image signal process from amongst the image signal processes in said sequence. The given image signal process has at least one processing step. Optionally, the plurality of hardware blocks are associated with separate switches, wherein a given switch activates the given hardware block to perform the given image signal process. Alternatively, optionally, an entirety of the plurality of hardware blocks are associated with a single switch, wherein the single switch activates the entirety of the plurality of hardware blocks to perform the sequence of image signal processes. Such implementations of the plurality of hardware blocks are feasible because the plurality of hardware blocks could be implemented using silicon chips, which are cheap and provide relatively faster processing. Different types of the image signal processes that are typically performed are well-known in the art.

Examples of the given image signal process include, but are not limited to, black level correction, defective pixel correction (DPC), Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, shot noise correction, chromatic aberration correction, reprojection, cropping, and resizing. As an example, the given image signal process may be the DPC, having two processing steps that are defective pixel detection (DPD), and subsequently either noise cleaning or defective pixel cancellation. All the aforementioned image signal processes are well-known in the art.

Optionally, the at least one processor is configured to provide the controller with instructions indicating the colour pattern according to which at least said part of the output image data is to be generated by the at least one neural network. In this regard, by indicating the colour pattern in said instructions, the at least one neural network would accurately know which part(s) of the output image data is/are to be generated according to the colour pattern. Thus, said instructions along with the image data are provided as an input to the at least one neural network, wherein the at least one neural network processes the image data based on said instructions, to generate at least said part of the output image in an accurate manner. Optionally, the instructions indicating the colour pattern are provided to the controller in form of an array of spatial pixel codes, wherein a given spatial pixel code represents a colour and optionally, a spatial position of a given photo-sensitive cell in the colour pattern. Photo-sensitive cells having same colours may or may not have a same spatial pixel code. The given spatial pixel code could, for example, be a numeric code, an alphabetic code, an alphanumeric code, and the like. In an example, for sake of simplicity and clarity, the colour pattern may correspond to a 4×4 array of photo-sensitive cells. In such a case, said instructions may comprises different spatial pixel codes, for example, such as '0' indicating a green colour filter, '1' indicating a blue colour filter, and '2' indicating a red colour filter.

Optionally, the at least one processor is configured to:
access, from a data storage, information indicative of a given colour pattern that corresponds to a given image signal processing (ISP) pipeline being employed, wherein the given ISP pipeline comprises the sequence of image signal processes that are to be performed on the output image data to generate the output image; and
select the given colour pattern indicated in said information as the colour pattern according to which at least said part of the output image data is to be generated.

In this regard, different colour patterns may correspond to different ISP pipelines comprising different sequences of image signal processes. Thus, for the at least one neural network to generate at least said part of the output image data according to the colour pattern, the at least one processor accesses the information indicative of the given colour pattern from the data storage, and then sends said information to the controller when providing the controller with instructions indicating the colour pattern. Beneficially, in this way, at least said part of the output image data is generated accurately. It will be appreciated that the step of accessing the information indicative of the given colour pattern may be performed by the at least one processor only once at a start of a given session of using the system. In other words, the step of accessing said information need not be repeated every time. It will also be appreciated that once the given colour pattern is selected as the colour pattern, the at least one processor accurately ascertains, using the aforesaid information, which image signal processes are to be performed on at least said part of the output image data. This facilitates in generating the output image in a time-efficient and computationally-efficient manner.

Optionally, the at least one processor is configured to provide the controller with gaze information indicative of a gaze direction of a user,
wherein the controller is configured to:
determine a first region and a second region in the photo-sensitive surface of the image sensor chip, based on the gaze direction, wherein the second region surrounds the first region; and
employ a first colour pattern and a second colour pattern for the first region and the second region, respectively, wherein a first part of the output image data that corresponds to the first region in the photo-sensitive surface is to be generated according to the first colour pattern, and a second part of the output image data that corresponds to the second region in the photo-sensitive surface is to be generated according to the second colour pattern.

Optionally, the at least one processor is configured to obtain, from a client device, the gaze information indicative of the gaze direction. The client device could be implemented, for example, as a head-mounted display (HMD) device. Optionally, the client device comprises gaze-tracking means. The term "gaze direction" refers to a direction in which a given eye of the user is gazing. Such a gaze direction may be a gaze direction of a single user of a client device, or be an average gaze direction for multiple users of different client devices. The gaze direction may be represented by a gaze vector. Furthermore, the term "gaze-tracking means" refers to specialised equipment for detecting and/or following a gaze of user's eyes. The gaze-tracking means could be implemented as contact lenses with sensors, cameras monitoring a position, a size and/or a shape of a pupil of the user's eye, and the like. The gaze-tracking means are well-known in the art. The term "head-mounted display" device refers to specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like. It will be appreciated that when the imaging system is remotely located from the client device, the at least one processor obtains the gaze information from the client device. Alternatively, when the imaging system is integrated into the client device, the at least one processor obtains the gaze from the gaze-tracking means of the client device.

Optionally, the gaze direction is a current gaze direction. Alternatively, optionally, the gaze direction is a predicted gaze direction. It will be appreciated that optionally the predicted gaze direction is predicted, based on a change in user's gaze, wherein the predicted gaze direction lies along a direction of the change in the user's gaze. Yet alternatively, optionally, the gaze direction is a default gaze direction, wherein the default gaze direction is straight towards a centre of a field of view of the image sensor chip.

Optionally, when determining the first region and the second region in the photo-sensitive surface, the controller is configured to map the gaze direction onto the photo-sensitive surface of the image sensor chip. The term "first region" refers to a region in the photo-sensitive surface onto which the gaze direction is mapped. The first region may, for example, be a central region in the photo-sensitive surface, a top-left region in the photo-sensitive surface, a bottom-right region in the photo-sensitive surface, or similar. The term "second region" refers to another region in the photo-sensitive surface that surrounds the first region. The another region may, for example, remain after excluding the gaze region from the photo-sensitive surface. It will be appreciated that the first region is understood to be a gaze region in the photo-sensitive surface, and the second region is understood to be a peripheral region in the photo-sensitive surface. This has been illustrated in conjunction with FIG. 3, for sake of better understanding and clarity.

It will be appreciated that the first region and the second region are optionally selected dynamically, based on the gaze direction. In this regard, the first region corresponds to a gaze area (i.e., a region of interest), whereas the second region corresponds to a peripheral area surrounding the gaze area. Such a dynamic manner of selecting the first region and the second region emulates a way in which the user actively focuses within his/her field of view. Optionally, an angular width of the second region lies in a range of 12.5-50 degrees from a gaze position to 45-110 degrees from the gaze position, while an angular extent of the first region lies in a range of 0 degree from the gaze position to 2-50 degrees from the gaze position, wherein the gaze position is a position on the photo-sensitive surface onto which the gaze direction is mapped.

Alternatively, in fixed-foveation implementations, the first region (namely, the gaze region) is determined in a fixed manner, according to a centre of the photo-sensitive surface. The aforesaid fixed manner of determining the first region beneficially emulates a way in which users generally focus within their fields of view.

In an example, when the CFA is a nona-Bayer CFA, the first colour pattern may be a standard Bayer colour pattern, while the second colour pattern may be a quad-Bayer colour pattern. The technical benefit of generating the first part and the second part of the output image data according to the first colour pattern and the second colour pattern, respectively, is that it facilitates in performing the sequence of image signal processes on the first part and the second part of the output image data in a time-efficient and computationally-efficient manner, thereby generating high-quality, realistic output images at a high framerate with accurate colour reproduction. This is because the first colour pattern and the second colour pattern are well-supported by (namely, are well-compatible or suitable with) the image signal processes of said sequence, as compared to the CFA. Moreover, the first pattern enables in reducing a noise in a corresponding region of the output image, and the second pattern enables in providing an accurate colour reproduction and resolution in a corresponding region of the output image. This may be generally applicable for the first pattern and the second pattern, or could be based on available ISP resources.

Optionally, when reading out the image data from the subset of the plurality of photo-sensitive cells, the at least one processor is configured to employ a subsampling pattern. The term "subsampling pattern" refers to a software-based masking pattern that enables in selectively reading out photo-sensitive cells from (a given region of the photo-sensitive surface) of the image sensor chip. In this regard, photo-sensitive cells whose locations are indicated in the subsampling pattern as skipped are not read out from the image sensor chip (and thus image data for such photo-sensitive cells is not obtained), while photo-sensitive cells whose locations are indicated in the subsampling pattern as not skipped are read out from the image sensor chip (and thus image data for such photo-sensitive cells is obtained). The subsampling pattern could be different for generating different regions of a same output image. For example, a subsampling pattern employed for the first region could be different from a subsampling pattern employed for the second region. Optionally, the subsampling pattern is a bit mask. As an example, in the subsampling pattern, '0' could indicate a photo-sensitive cell to be skipped and '1' could indicate a photo-sensitive cell to be read out. It will be appreciated that the subsampling pattern could be a non-regular pattern, wherein the non-regular pattern is a software-based masking pattern which indicates locations of irregularly-arranged (i.e., disorderly arranged) photo-sensitive cell in the image sensor chip that are to be read out. The subsampling pattern could alternatively be a random pattern, a gradient-type pattern, or a regular pattern.

In an embodiment, a resolution of the output image data is higher than a resolution of the image data provided as the input to the at least one neural network. In this regard, greater the resolution of the output image data, greater is the resolution of the output image that is generated upon performing the sequence of image signal processes, and vice versa. This considerably improves a viewing experience of a user (for example, in terms of realism and immersiveness), when said output image is displayed to the user. Optionally, an aspect ratio of the output image data is different from a physical aspect ratio of the photo-sensitive surface.

In another embodiment, the controller is configured to downscale the image data to generate the output image data by using the at least one neural network, wherein the image data is optionally downscaled in a reversible manner. In this regard, in some instances, the image data read out from the image sensor chip may have a considerably large size and thus, said image data is downscaled (namely, compressed or encoded) to generate the output image data having a low resolution. Upon downscaling, an original (high) resolution at which the image data has been read out, is reduced to a new resolution, wherein the new resolution is a fraction of the original resolution. It will be appreciated that the aforesaid downscaling facilitates in saving storage and transmission resources, as the output image data generated using the (downscaled) image data requires lesser storage and transmission resources, as compared to a case where the image data having the original (high) resolution is used for generating the output image data. Moreover, said output image data is communicated to the at least one processor in a bandwidth-efficient manner in real time or near-real time (i.e., without any latency/delay).

Optionally, upon receiving the output image data, the at least one processor is configured to upscale (namely, decompress or decode) the output image data, for generating the output image. It will be appreciated that since downscaling of the image data is performed in the reversible manner, the aforesaid upscaling is performed in a manner that a resolution of the output image data generated using the downscaled image data is nearly same as a resolution of the output image data that would be generated using the image data having the original (high) resolution. Advantageously, this facilitates in significantly improving compression efficiency in downscaling without any perceivable loss in image quality of the output image. It may be noted that the at least one processor may employ an upscaling algorithm (namely, a decompression algorithm) that is well-compatible with a downscaling algorithm (that was employed by the controller when downscaling the image data). Downscaling and upscaling image data are well-known in the art.

Optionally, when downscaling the image data in the reversible manner, the at least one processor is configured to employ at least one image rescaling technique. Optionally, the at least one image rescaling technique is at least one of: an invertible image rescaling technique, a reversible data hiding technique, a lossless compression technique. The aforesaid image rescaling techniques are well-known in the art. It will be appreciated that the invertible image rescaling technique may employ a wavelet transformation, wherein the image data is downscaled into different frequency subbands (namely, wavelets), thereby reducing an overall size of the image data while preserving as much of its visual information as possible. Such an invertible image rescaling technique is described, for example, in "*Invertible Image Rescaling*" by Mingqing Xiao et al., published in Computer Vision—European Conference on Computer Vision, Vol. 12346, pp. 126-144, November 2020, which has been incorporated herein by reference.

Optionally, the given physical smallest repeating unit further comprises at least one infrared filter, wherein the at least one processor is configured to receive, from the controller, output depth data generated by the at least one neural network also, wherein a resolution of the output depth data is higher than a resolution of input depth data read out by the image sensor chip, the input depth data being read out from those photo-sensitive cells that correspond to infrared filters. In this regard, in addition to the first type of colour filters, the second type of colour filters, and the third type of colour filters (as descried earlier), the given physical smallest repeating unit also comprises the at least one infrared filter, wherein the at least one infrared filter allows at least one infrared wavelength (for example, lying in an infrared wavelength range) to pass therethrough. It will be appreciated that the at least one infrared filter may be arranged on an optical path of a depth pixel of the photo-sensitive surface, wherein said depth pixel is one of: a direct Time-of-Flight (dToF) pixel, an indirect Time-of-Flight (iToF) pixel, a single-photon avalanche diode (SPAD) depth pixel. Furthermore, the output depth data would be generated by the at least one neural network using the input depth data, in addition to generating the output image data using the image data. The term "input depth data" refers to depth information pertaining to a given photo-sensitive cell of the image sensor chip, wherein said depth information comprises a depth value of the given photo-sensitive cell. It is to be understood that the input depth data is read out and processed in a similar manner as the image data is read out and processed. It will be appreciated that the at least one neural network can also be employed to generate output depth data, by utilising said image data read out from said subset of the plurality of photo-sensitive cells, wherein a resolution of the output depth data is higher than a resolution of said image data. In this regard, the at least one neural network would be designed to process combined image data from CFA-based pixels and IR-based pixels and upscale it to generate high-resolution depth information.

It will be appreciated that due to the presence of the at least one infrared filter, depth information (such as optical depth values) of pixels representing objects or their parts being imaged by the (same) image sensor chip can be highly accurately estimated (namely, measured). Thus, no additional depth sensor is required to employed for sensing depth information. Moreover, optionally, the at least one processor perform a sequence of image signal processes on the output depth data, in addition to the output image data, to generate the output image. The sequence of image signal processes to be performed on the output depth data may differ from the sequence of image signal processes to be performed on the output image data. When both the output image data and the output depth data are utilised for generating the output image, the output image is highly accurately and realistically generated. This considerably improves a viewing experience of a user (for example, in terms of realism and immersiveness), when said output image is displayed to the user. This may, particularly, be beneficial in a scenario where at least a portion of the output depth data is generated for a region of the output image that corresponds to the second region (namely, the peripheral region) in the photo-sensitive surface. Due to this, said region of the output image would be generated with minimal (i.e., imperceptible) noise, and the user would not perceive any flicker or jerk in said region of the output image, because the noise is typically more perceivable in a peripheral region of any image, as compared to a gaze region of said image.

The present disclosure also relates to the method as described above. Various embodiments and variants disclosed above, with respect to the aforementioned the imaging system, apply mutatis mutandis to the method.

Optionally, the method further comprises providing the controller with instructions indicating the colour pattern according to which at least said part of the output image data is to be generated by the at least one neural network.

Optionally, the method further comprises:

accessing, from a data storage, information indicative of a given colour pattern that corresponds to a given image signal processing (ISP) pipeline being employed, wherein the given ISP pipeline comprises the sequence of image signal processes that are to be performed on the output image data to generate the output image; and selecting the given colour pattern indicated in said information as the colour pattern according to which at least said part of the output image data is to be generated.

Optionally, the method further comprises:

providing, to the controller, gaze information indicative of a gaze direction of a user;

determining, at the controller, a first region and a second region in the photo-sensitive surface of the image sensor chip, based on the gaze direction, wherein the second region surrounds the first region; and employing, at the controller, a first colour pattern and a second colour pattern for the first region and the second region, respectively, wherein a first part of the output image data that corresponds to the first region in the photo-sensitive surface is to be generated according to the first colour pattern, and a second part of the output image data that corresponds to the second region in the photo-sensitive surface is to be generated according to the second colour pattern.

Optionally, the method further comprises:

reading out, by the controller, the image data from the image sensor chip, by:

(i) selectively skipping reading out from those photo-sensitive cells in at least a region of the photo-sensitive surface that correspond to: at least one colour filter in at least one array of the first type of colour filters, at least one colour filter in at least one array of the second type of colour filters, and at least one colour filter in at least one array of the third type of colour filters, of a given physical smallest repeating unit; and (ii) reading out from those photo-sensitive cells in at least the region of the photo-sensitive surface that correspond to: remaining colour filters in the at least one array of the first type of colour filters, remaining colour filters in the at least one array of the second type of colour filters, and remaining colour filters in at least one array of the third type of colour filters, of the given physical smallest repeating unit; and providing, by the controller, said image data as an input to the at least one neural network.

Optionally, the method further comprises employing binning, by the controller, when reading out from neighbouring photo-sensitive cells in at least said region of the photo-sensitive surface that correspond to colour filters of a same type.

Optionally, the method further comprises using, at the controller, at least two different settings pertaining to at least one of: an exposure time, a sensitivity, an aperture size, when reading out from the neighbouring photo-sensitive cells in at least said region of the photo-sensitive surface that correspond to the colour filters of the same type.

Optionally, in the method, a resolution of the output image data is higher than a resolution of the image data provided as the input to the at least one neural network.

Alternatively, optionally, the method further comprises downscaling, at the controller, the image data to generate the output image data by using the at least one neural network, wherein the image data is optionally downscaled in a reversible manner.

Optionally, in the method, the given physical smallest repeating unit further comprises at least one infrared filter, wherein when receiving from the controller, output depth data is generated by the at least one neural network also, wherein a resolution of the output depth data is higher than a resolution of input depth data read out by the image sensor chip, the input depth data being read out from those photo-sensitive cells that correspond to infrared filters.

DETAILED DESCRIPTION OF THE DRAWINGS

Referring to FIG. 1A, illustrated is a simplified example implementation of an imaging system 100 incorporating hallucinating colour filter arrays on image sensor chips, in accordance with an embodiment of the present disclosure. The simplified example implementation has been shown using an exploded view in FIG. 1A. The imaging system 100 comprises an image sensor chip 102 and at least one processor (for example, depicted as a processor 104). The image sensor chip 102 comprises a photo-sensitive surface 106, a colour filter array (CFA) 108, and a controller 110. The photo-sensitive surface 106 comprises a plurality of photo-sensitive cells 112. Optionally, the imaging system 100 further comprises a data storage 114. The processor 104 is shown to be communicably coupled to the controller 110, and optionally to the data storage 114. For sake of simplicity and clarity, a portion of the CFA 108 is shown corresponding to a portion of the photo-sensitive surface 106. The shown portion of the CFA 108 comprises a first type of colour filters 116 (for example, a green-type of colour filters, depicted using a letter "G"), a second type of colour filters 118 (for example, a red-type of colour filters, depicted using a letter "R"), and a third type of colour filters 120 (for example, a blue-type of colour filters, depicted using a letter "B"). Said portion of the photo-sensitive surface 106 comprises 144 photo-sensitive cells arranged in an 12×12 grid, and colour filters in the shown portion of the CFA 108 are arranged in front of respective ones of the 144 photo-sensitive cells. It will be appreciated that a photo-sensitive surface of a typical image sensor has millions of photosensitive cells (namely, pixels). The CFA 108 comprises a plurality of physical smallest repeating units, wherein a given physical smallest repeating unit 122 (depicted as a 6×6 array of colour filters, using a dash-dot line box) is repeated throughout the CFA 108. With reference to FIG. 1A, the given physical smallest repeating unit 122 comprises two 3×3 arrays 124a and 124b of the first type of colour filters 116 (i.e., the green-type of colour filters), one 3×3 array 126 of the second type of colour filters 118 (i.e., the red-type of colour filters), and one 3×3 array 128 of the third type of colour filters 120 (i.e., the blue-type of colour filters). In other words, the CFA 108 is shown as a 9C Bayer CFA (also referred to as "nona-Bayer CFA"), for illustration purposes only. The processor 104 is configured to perform various operations, as described earlier with respect to the aforementioned first aspect. The controller 110 is configured to employ at least one neural network during read out of image data from a subset of the plurality of photo-sensitive cells 112.

It may be understood by a person skilled in the art that FIG. 1A includes a simplified example implementation of the imaging system 100, for sake of clarity, which should not unduly limit the scope of the claims herein. It is to be understood that the specific implementation of the imaging system 100 is not to be construed as limiting it to specific numbers or types of image sensor chips, processors, controllers, photo-sensitive cells, colour filters, and colour filter arrays. The person skilled in the art will recognize many variations, alternatives, and modifications of embodiments of the present disclosure.

Figure 1D:
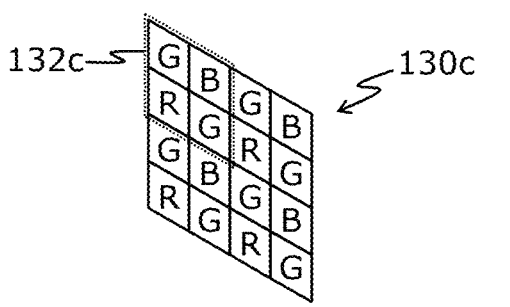
Figure 1E:
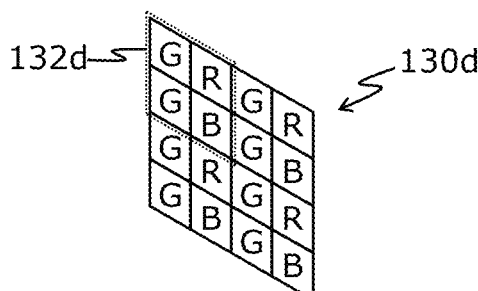
Figure 1F:
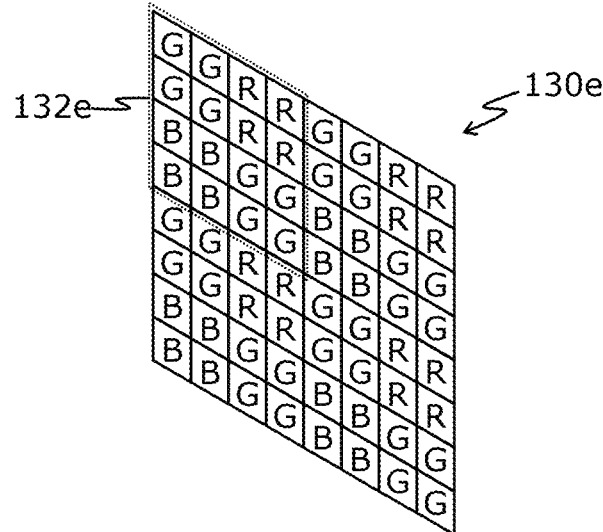

Referring to FIGS. 1B, 1C, 1D, 1E and 1F, illustrated are various different examples of a colour pattern 130a, 130b, 130c, 130d, and 130e according to which at least a part of output image data is to be generated by at least one neural network, in accordance with an embodiment of the present disclosure. With reference to FIGS. 1B, 1C, 1D, 1E and 1F, the output image data is generated by the at least one neural network of a controller (for example, such as the controller 110 shown in FIG. 1A) in a RAW image format. With reference to FIG. 1B, a smallest repeating unit 132a in the colour pattern 130a corresponds to a standard Bayer colour pattern, for example, depicted as a BGGR-based colour pattern. With reference to FIG. 1C, a smallest repeating unit 132b in the colour pattern 130b corresponds to a standard Bayer colour pattern, for example, depicted as an RGGB-based colour pattern. With reference to FIG. 1D, a smallest repeating unit 132c in the colour pattern 130c corresponds to a standard Bayer colour pattern, for example, depicted as a GBRG-based colour pattern. With reference to FIG. 1E, a smallest repeating unit 132d in the colour pattern 130d corresponds to a standard Bayer colour pattern, for example, depicted as a GRBG-based colour pattern. With reference to FIG. 1F, a smallest repeating unit 132e in the colour pattern 130e corresponds to a 4C Bayer colour pattern (also referred to as "quad-Bayer colour pattern" or "tetra-Bayer colour pattern). Now, collectively referring to FIGS. 1A, 1B, 1C, 1D, 1E and 1F, it can be observed that the colour patterns 130a-e according to which at least said part of the output image data is to be generated, are different from the given physical smallest repeating unit 122 in the CFA 108 of the image sensor chip 102.

Figure 2A:
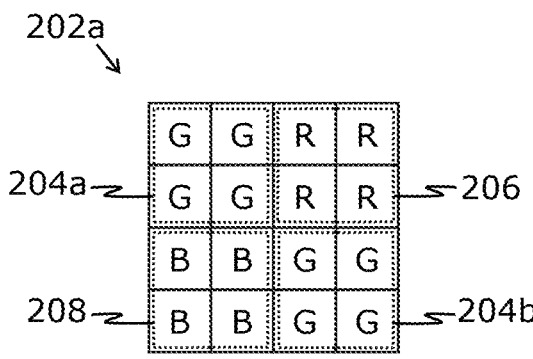
FIGS. 2A, 2B, 2C, and 2D illustrate various different examples of a given physical smallest repeating unit in a given colour filter array (CFA), in accordance with an embodiment of the present disclosure.

Referring to FIGS. 2A, 2B, 2C, and 2D, illustrated are various different examples of a given physical smallest repeating unit 202a, 202b, 202c, and 202d in a given colour filter array (CFA), in accordance with an embodiment of the present disclosure. With reference to FIGS. 2A-2D, the given physical smallest repeating units 202a-d are represented as 4×4 arrays of colour filters. With reference to FIG. 2A, the given physical smallest repeating unit 202a comprises two 2×2 arrays 204a and 204b of a first type of colour filters (for example, a green-type of colour filters, depicted using a letter "G"), one 2×2 array 206 of a second type of colour filters (for example, a red-type of colour filters, depicted using a letter "R"), and one 2×2 array 208 of a third type of colour filters (for example, a blue-type of colour filters, depicted using a letter "B"). The given physical smallest repeating unit 202a is a smallest repeating unit in a 4C Bayer CFA (also referred to as "quad-Bayer CFA").

Figure 2B:
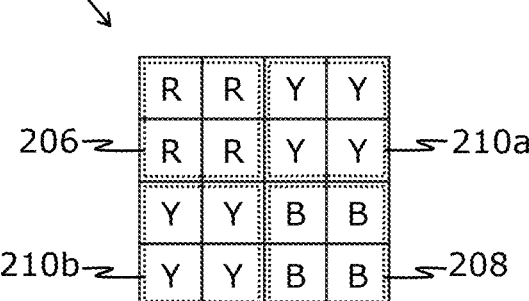
Figure 2C:
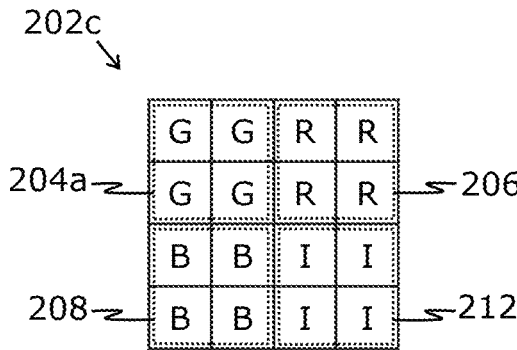
Figure 2D:
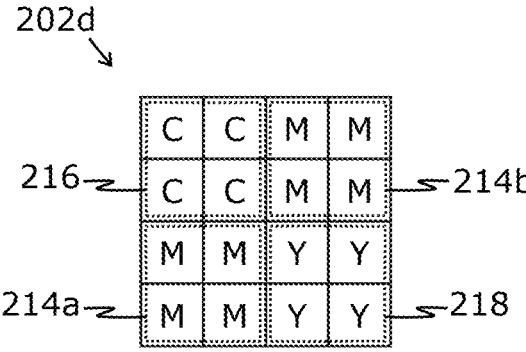

With reference to FIG. 2B, the given physical smallest repeating unit 202b comprises two 2×2 arrays 210a and 210b of a first type of colour filters (for example, a yellow-type of colour filters, depicted using a letter "Y"), one 2×2 array 206 of a second type of colour filters (for example, a red-type of colour filters, depicted using a letter "R"), and one 2×2 array 208 of a third type of colour filters (for example, a blue-type of colour filters, depicted using a letter "B"). With reference to FIG. 2C, the given physical smallest repeating unit 202c comprises one 2×2 array 204a of a first type of colour filters (for example, a green-type of colour filters, depicted using a letter "G"), one 2×2 array 206 of a second type of colour filters (for example, a red-type of colour filters, depicted using a letter "R"), one 2×2 array 208 of a third type of colour filters (for example, a blue-type of colour filters, depicted using a letter "B"), and one 2×2 array 212 of infrared filters (depicted using a letter "I"). With reference to FIG. 2D, the given physical smallest repeating unit 202d comprises two 2×2 arrays 214a and 214b of a first type of colour filters (for example, a magenta-type of colour filters, depicted using a letter "M"), one array 216 of a second type of colour filters (for example, a cyan-type of colour filters, depicted using a letter "C"), and one array 218 of a third type of colour filters (for example, a yellow-type of colour filters, depicted using a letter "Y"). It will be appreciated that the given physical smallest repeating units 202b-d are smallest repeating units in non-Bayer CFAs.

Figure 3:
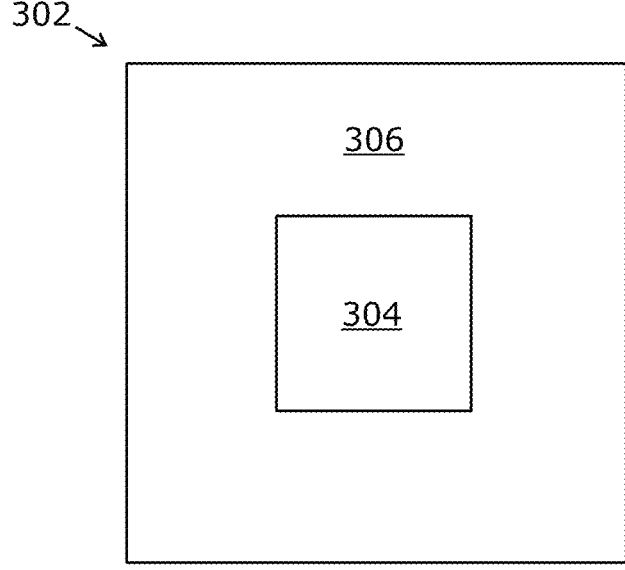
FIG. 3 illustrates different regions of a photo-sensitive surface of an image sensor chip, in accordance with an embodiment of the present disclosure.

Referring to FIG. 3, illustrated are different regions of a photo-sensitive surface 302 of an image sensor chip, in accordance with an embodiment of the present disclosure. The photo-sensitive surface 302 comprises a first region 304 and a second region 306, wherein the second region 306 surrounds the first region 304. The first region 304 is to be understood to be a gaze region in the photo-sensitive surface 302, and the second region 306 is to be understood to be a peripheral region in the photo-sensitive surface 302. The first region 304 and the second region 306 are determined (by a controller of the image sensor chip), based on a gaze direction of a user. As an example, the gaze direction of the user may be at a centre of the photo-sensitive surface 302. It will be appreciated that in some implementations, when reading out image data from the photo-sensitive surface 302, subsampling is employed only in the second region 306. In other implementations, when reading out image data from the photo-sensitive surface 302, subsampling is employed for an entirety of the photo-sensitive surface 302 with a first subsampling density in the first region 304, and with a second subsampling density in the second region 306, the first subsampling density being higher than the second subsampling density.

Collectively referring to FIGS. 1B-1F and FIG. 3, in some implementations, a single part of the output image data (for example, corresponding to the first region 304) is generated according to any one of the colour patterns 130a-e, while a remaining part of the output image data (for example, corresponding to the second region 306) is generated according to the CFA 108. In other implementations, an entirety of the output image data is generated according to any one of the colour patterns 130a-e. In yet other implementations, different parts of the output image data are generated according to different colour patterns. In an example, a first part of the output image data that corresponds to the first region 304 is to be generated according to a first colour pattern which could be any one of the colour patterns 130a-d (namely, standard Bayer colour patterns), and a second part of the output image data that corresponds to the second region 306 is to be generated according to a second colour pattern could be the colour pattern 130e (namely, the quad-Bayer colour pattern).

Figure 4A:
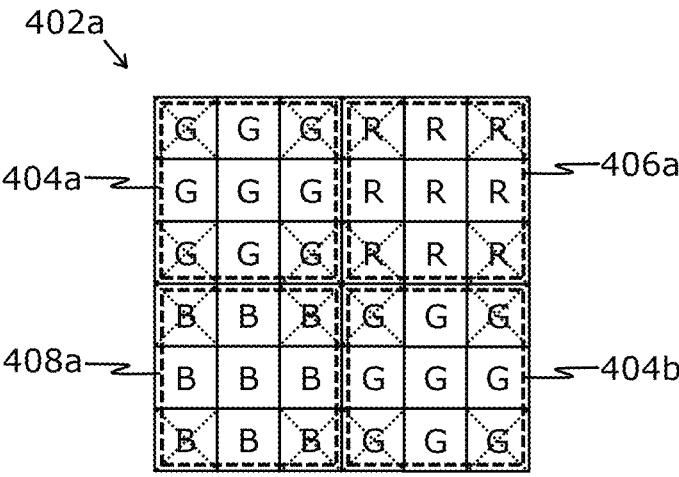
Figure 4B:
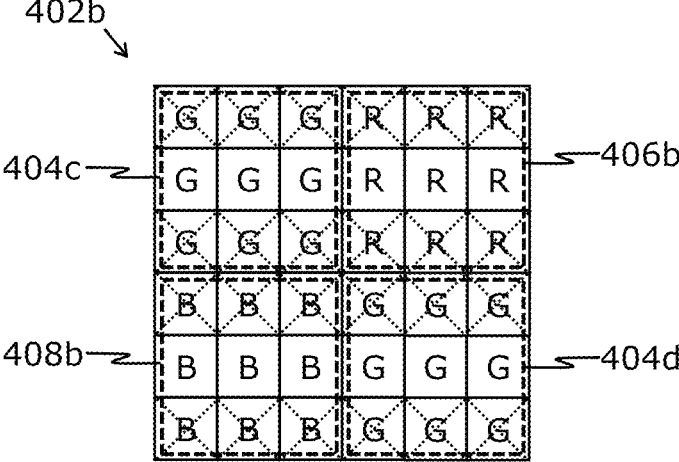
FIG. 4B illustrates how subsampling is employed when reading out image data from a second region surrounding the first region of the photo-sensitive surface, in accordance with an embodiment of the present disclosure.

Referring to FIGS. 4A and 4B, FIG. 4A illustrates how subsampling is employed when reading out image data from a first region of a photo-sensitive surface of an image sensor chip, while FIG. 4B illustrates how subsampling is employed when reading out image data from a second region surrounding the first region of the photo-sensitive surface, in accordance with an embodiment of the present disclosure. With reference to FIGS. 4A and 4B, the first region is to be understood to be a gaze region in the photo-sensitive surface, and the second region is to be understood to be a peripheral region in the photo-sensitive surface. With reference to FIG. 4A, for sake of simplicity and better understanding, the subsampling is shown to be employed for a given physical smallest repeating unit 402a of a colour filter array (CFA) corresponding to a portion of the first region, wherein said portion of the first region comprises 36 photo-sensitive cells arranged in a 6×6 grid, and wherein colour filters of the given physical smallest repeating unit 402a are arranged in front of respective ones of the 36 photo-sensitive cells. Similarly, with reference to FIG. 4B, the subsampling is shown to be employed for another given physical smallest repeating unit 402*b* of the (same) CFA corresponding to a portion of the second region, wherein said portion of the second region comprises 36 photo-sensitive cells arranged in a 6×6 grid, and wherein colour filters of the given physical smallest repeating unit 402*b* are arranged in front of respective ones of the 36 photo-sensitive cells. The first region is to be understood to be a gaze region in the photo-sensitive surface, and the second region is to be understood to be a peripheral region in the photo-sensitive surface.

With reference to FIG. 4A, the given physical smallest repeating unit 402*a* comprises two 3×3 arrays 404*a* and 404*b* of a first type of colour filters (for example, a green-type of colour filters, depicted using a letter "G"), one 3×3 array 406*a* of a second type of colour filters (for example, a red-type of colour filters, depicted using a letter "R"), and one 3×3 array 408*a* of a third type of colour filters (for example, a blue-type of colour filters, depicted using a letter "B"). With reference to FIG. 4B, the another given physical smallest repeating unit 402*b* comprises two 3×3 arrays 404*c* and 404*d* of the first type of colour filters, one 3×3 array 406*b* of the second type of colour filters, and one 3×3 array 408*b* of the third type of colour filters. Thus, the CFA is implemented as a 9C Bayer CFA (also referred to as "nona-Bayer CFA"), for illustration purposes only. Other different type of CFA could also be employed.

With reference to FIG. 4A, when performing the subsampling in the first region, the image data can be read out from 20 photo-sensitive cells of the photo-sensitive surface that correspond to: 5 colour filters in each of the two 3×3 arrays 404*a* and 404*b* of the first type of colour filters, 5 colour filters in the 3×3 array 406*a* of the second type of colour filters, and 5 colour filters in the 3×3 array 408*a* of the third type of colour filters, of the given physical smallest repeating unit 402*a*. Simultaneously, the image data from remaining 16 photo-sensitive cells (crossed out as dotted 'X's) of the photo-sensitive surface can be skipped (i.e., not read out), wherein the remaining 16 photo-sensitive cells correspond to: 4 colour filters in each of the two 3×3 arrays 404*a* and 404*b* of the first type of colour filters, 4 colour filters in the 3×3 array 406*a* of the second type of colour filters, and 4 colour filters in the 3×3 array 408*a* of the third type of colour filters, of the given physical smallest repeating unit 402*a*.

With reference to FIG. 4B, when performing the subsampling in the second region, the image data can be read out from 12 photo-sensitive cells of the photo-sensitive surface that correspond to: 3 colour filters in each of the two 3×3 arrays 404*c* and 404*d* of the first type of colour filters, 3 colour filters in the 3×3 array 406*b* of the second type of colour filters, and 3 colour filters in the 3×3 array 408*b* of the third type of colour filters, of the given physical smallest repeating unit 402*b*. Simultaneously, the image data from remaining 24 photo-sensitive cells of the photo-sensitive surface can be skipped (i.e., not read out), wherein the remaining 24 photo-sensitive cells correspond to: 6 colour filters in each of the two 3×3 arrays 404*c* and 404*d* of the first type of colour filters, 6 colour filters in the 3×3 array 406*b* of the second type of colour filters, and 6 colour filters in the 3×3 array 408*b* of the third type of colour filters, of the given physical smallest repeating unit 402*b*.

Figure 5A:
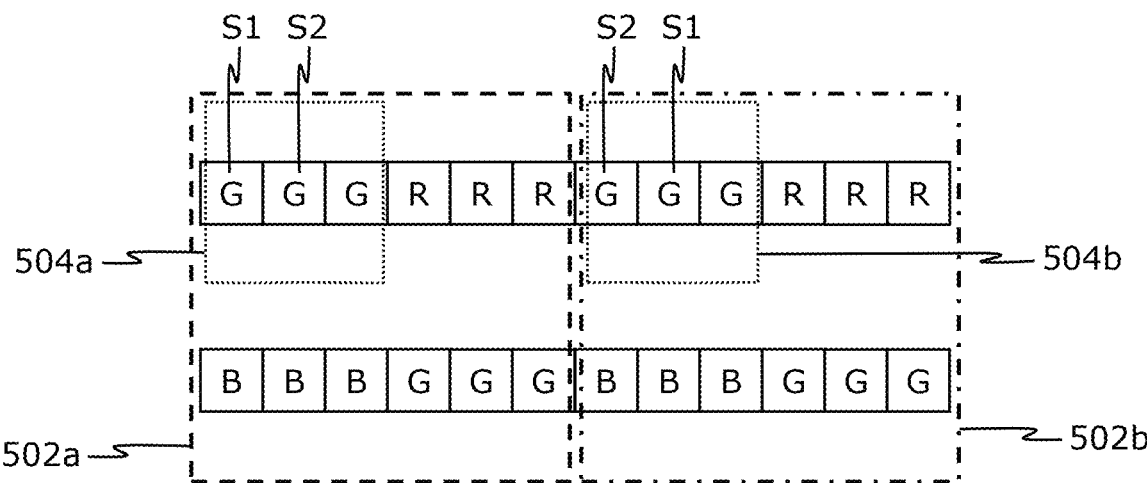
FIG. 5A illustrates an exemplary way of how different orders of a first setting and a second setting are used, when reading out image data, in accordance with an embodiment of the present disclosure.

Referring to FIG. 5A, illustrated is an exemplary way of how different orders of a first setting S1 and a second setting S2 are used, when reading out image data, in accordance with an embodiment of the present disclosure. With reference to FIG. 5A, for sake of simplicity and illustration purposes only, the image data upon subsampling is shown in FIG. 5A, wherein for a given physical smallest repeating unit comprising 36 colour filters, the image data is shown to be read out from only 12 photo-sensitive cells that correspond to: 3 colour filters in each of two 3×3 arrays of a green colour filters, 3 colour filters in a 3×3 array of red colour filters, and 3 colour filters in a 3×3 array of blue colour filters, of the given physical smallest repeating unit. Thus, only those photo-sensitive cells that have been actually read out are shown, while remaining photo-sensitive cells that have not been read out are shown as empty spaces, only for sake of clarity. The first setting S1 and the second setting S2 are different from each other, and pertain to at least one of: different exposure times, different sensitivities, different aperture sizes. As shown, the image data from two neighbouring physical smallest repeating units (namely, a given physical smallest repeating unit 502*a* (depicted using a dashed line box) and another given physical smallest repeating unit 502*b* (depicted using a dash-dot line box) is read out using the different orders. As shown, for a given 3×3 array 504*a* (depicted using a dotted line box) of green colour filters in the given physical smallest repeating unit 502*a*, first two photo-sensitive cells are read out, in a manner that a first photo-sensitive cell corresponding to a first green colour filter and a second photo-sensitive cell corresponding to a second green colour filter are read out using the first setting S1 and the second setting S2, respectively. However, for a neighbouring 3×3 array 504*b* (depicted using a dotted line box) of green colour filters in the another given smallest repeating unit 502*b*, first two photo-sensitive cells are read out, in a manner that a first photo-sensitive cell corresponding to a first green colour filter and a second photo-sensitive cell corresponding to a second green colour filter are read out using the second setting S2 and the first setting S1, respectively.

Figure 5B:
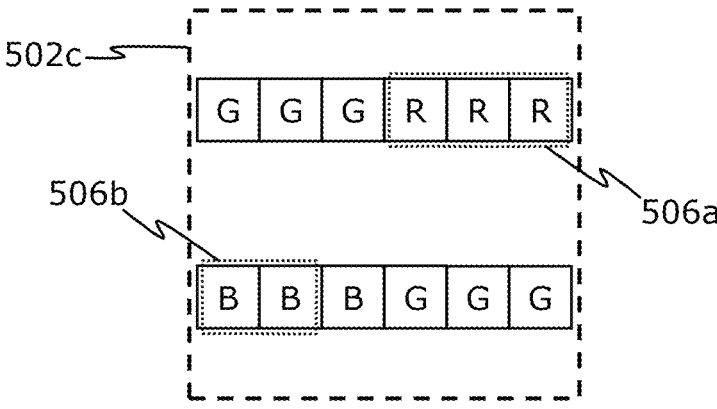
FIG. 5B illustrates an exemplary scenario of binning at least two photo-sensitive cells when reading out image data, in accordance with an embodiment of the present disclosure.

Referring to FIG. 5B, illustrated is an exemplary scenario of binning at least two photo-sensitive cells when reading out image data, in accordance with an embodiment of the present disclosure. With reference to FIG. 5B, it is shown that how the image data from a given physical smallest repeating unit 502*c* (depicted using a dashed line box) in a colour filter array (CFA) is read out. For sake of simplicity and illustration purposes only, the image data upon subsampling is shown in FIG. 5B, wherein for the given physical smallest repeating unit 502*c* comprising 36 colour filters, the image data is shown to be read out from only 12 photo-sensitive cells that correspond to: 3 colour filters in each of two 3×3 arrays of a green colour filters, 3 colour filters in a 3×3 array of red colour filters, and 3 colour filters in a 3×3 array of blue colour filters, of the given physical smallest repeating unit 502*c*. Thus, only those photo-sensitive cells that have been actually read out are shown, while remaining photo-sensitive cells that have not been read out are shown as empty spaces, only for sake of clarity. As shown, a group 506*a* of three photo-sensitive cells that correspond to respective ones of three red colour filters, is binned together to form a single super photo-sensitive cell. Similarly, another group 506*b* of two photo-sensitive cells that correspond to respective ones of two green colour filters, is binned together to form another single super photo-sensitive cell.

FIGS. 1B-1F, 2A-2D, 3, 4A-4B, and 5A-5B are merely examples, which should not unduly limit the scope of the claims herein. The person skilled in the art will recognize many variations, alternatives, and modifications of embodiments of the present disclosure.

Figure 6:
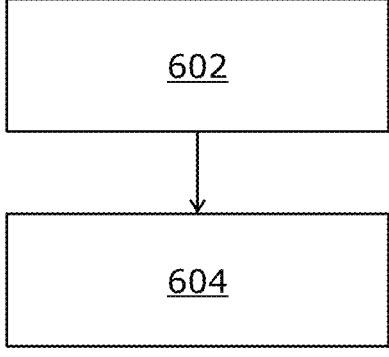
FIG. 6 illustrates steps of a method incorporating hallucinating colour filter arrays on image sensor chips, in accordance with an embodiment of the present disclosure.

Referring to FIG. 6, illustrated are steps of a method incorporating hallucinating colour filter arrays on image sensor chips, in accordance with an embodiment of the present disclosure. At step 602, output image data is received from a controller, wherein the output image data generated by at least one neural network, the output image data being in a RAW image format, wherein a smallest repeating unit in a colour pattern of at least a part of the output image data is different from a given physical smallest repeating unit in a colour filter array of an image sensor chip, wherein the image sensor chip comprises: a photo-sensitive surface comprising a plurality of photo-sensitive cells; the colour filter array arranged on an optical path of the photo-sensitive surface, the colour filter array comprising a plurality of physical smallest repeating units, wherein the given physical smallest repeating unit comprises at least one array of a first type of colour filters that allow at least one first wavelength lying in a first wavelength range to pass through, at least one array of a second type of colour filters that allow at least one second wavelength lying in a second wavelength range to pass through, and the at least one array of a third type of colour filters that allow at least one third wavelength lying in a third wavelength range to pass through; and the controller configured to employ the at least one neural network during read out of image data from a subset of the plurality of photo-sensitive cells. At step 604, a sequence of image signal processes is performed on the output image data to generate an output image.

The aforementioned steps are only illustrative and other alternatives can also be provided where one or more steps are added, one or more steps are removed, or one or more steps are provided in a different sequence without departing from the scope of the claims.

The invention claimed is:
1. An imaging system comprising:
an image sensor chip comprising:
    a photo-sensitive surface comprising a plurality of photo-sensitive cells;
    a colour filter array arranged on an optical path of the photo-sensitive surface, the colour filter array comprising a plurality of physical smallest repeating units, wherein a given physical smallest repeating unit comprises at least one array of a first type of colour filters that allow at least one first wavelength lying in a first wavelength range to pass through, at least one array of a second type of colour filters that allow at least one second wavelength lying in a second wavelength range to pass through, and at least one array of a third type of colour filters that allow at least one third wavelength lying in a third wavelength range to pass through; and
    a controller configured to employ at least one neural network during read out of image data from a subset of the plurality of photo-sensitive cells; and
at least one processor configured to:
    receive, from the controller, output image data generated by the at least one neural network, the output image data being in a RAW image format, wherein a smallest repeating unit in a colour pattern of at least a part of the output image data is different from the given physical smallest repeating unit in the colour filter array of the image sensor chip; and
    perform a sequence of image signal processes on the output image data to generate an output image.
2. The imaging system of claim 1, wherein the at least one processor is configured to provide the controller with instructions indicating the colour pattern according to which at least said part of the output image data is to be generated by the at least one neural network.

3. The imaging system of claim 2, wherein the at least one processor is configured to:
    access, from a data storage, information indicative of a given colour pattern that corresponds to a given image signal processing (ISP) pipeline being employed, wherein the given ISP pipeline comprises the sequence of image signal processes that are to be performed on the output image data to generate the output image; and
    select the given colour pattern indicated in said information as the colour pattern according to which at least said part of the output image data is to be generated.
4. The imaging system of claim 1, wherein the at least one processor is configured to provide the controller with gaze information indicative of a gaze direction of a user,
    wherein the controller is configured to:
        determine a first region and a second region in the photo-sensitive surface of the image sensor chip, based on the gaze direction, wherein the second region surrounds the first region; and
        employ a first colour pattern and a second colour pattern for the first region and the second region, respectively, wherein a first part of the output image data that corresponds to the first region in the photo-sensitive surface is to be generated according to the first colour pattern, and a second part of the output image data that corresponds to the second region in the photo-sensitive surface is to be generated according to the second colour pattern.
5. The imaging system of claim 1, wherein the controller is configured to:
    read out the image data from the image sensor chip, by:
        (i) selectively skipping read out from those photo-sensitive cells in at least a region of the photo-sensitive surface that correspond to: at least one colour filter in at least one array of the first type of colour filters, at least one colour filter in at least one array of the second type of colour filters, and at least one colour filter in at least one array of the third type of colour filters, of a given physical smallest repeating unit; and
        (ii) reading out from those photo-sensitive cells in at least the region of the photo-sensitive surface that correspond to: remaining colour filters in the at least one array of the first type of colour filters, remaining colour filters in the at least one array of the second type of colour filters, and remaining colour filters in at least one array of the third type of colour filters, of the given physical smallest repeating unit; and
    provide said image data as an input to the at least one neural network.
6. The imaging system of claim 5, wherein the controller is configured to employ binning when reading out from neighbouring photo-sensitive cells in at least said region of the photo-sensitive surface that correspond to colour filters of a same type.
7. The imaging system of claim 6, wherein the controller is configured to use at least two different settings pertaining to at least one of: an exposure time, a sensitivity, an aperture size, when reading out from the neighbouring photo-sensitive cells in at least said region of the photo-sensitive surface that correspond to the colour filters of the same type.
8. The imaging system of claim 5, wherein a resolution of the output image data is higher than a resolution of the image data provided as the input to the at least one neural network.
9. The imaging system of claim 1, wherein the controller is configured to downscale the image data to generate the output image data by using the at least one neural network, wherein the image data is optionally downscaled in a reversible manner.

10. The imaging system of claim 1, wherein the given physical smallest repeating unit further comprises at least one infrared filter, wherein the at least one processor is configured to receive, from the controller, output depth data generated by the at least one neural network also, wherein a resolution of the output depth data is higher than a resolution of input depth data read out by the image sensor chip, the input depth data being read out from those photo-sensitive cells that correspond to infrared filters.

11. A method comprising:

receiving, from a controller, output image data generated by at least one neural network, the output image data being in a RAW image format, wherein a smallest repeating unit in a colour pattern of at least a part of the output image data is different from a given physical smallest repeating unit in a colour filter array of an image sensor chip, wherein the image sensor chip comprises: a photo-sensitive surface comprising a plurality of photo-sensitive cells; the colour filter array arranged on an optical path of the photo-sensitive surface, the colour filter array comprising a plurality of physical smallest repeating units, wherein the given physical smallest repeating unit comprises at least one array of a first type of colour filters that allow at least one first wavelength lying in a first wavelength range to pass through, at least one array of a second type of colour filters that allow at least one second wavelength lying in a second wavelength range to pass through, and the at least one array of a third type of colour filters that allow at least one third wavelength lying in a third wavelength range to pass through; and the controller configured to employ the at least one neural network during read out of image data from a subset of the plurality of photo-sensitive cells; and performing a sequence of image signal processes on the output image data to generate an output image.

12. The method of claim 11, further comprising providing the controller with instructions indicating the colour pattern according to which at least said part of the output image data is to be generated by the at least one neural network.

13. The method of claim 12, further comprising:

accessing, from a data storage, information indicative of a given colour pattern that corresponds to a given image signal processing (ISP) pipeline being employed, wherein the given ISP pipeline comprises the sequence of image signal processes that are to be performed on the output image data to generate the output image; and selecting the given colour pattern indicated in said information as the colour pattern according to which at least said part of the output image data is to be generated.

14. The method of claim 11, further comprising:

providing, to the controller, gaze information indicative of a gaze direction of a user;

determining, at the controller, a first region and a second region in the photo-sensitive surface of the image sensor chip, based on the gaze direction, wherein the second region surrounds the first region; and employing, at the controller, a first colour pattern and a second colour pattern for the first region and the second region, respectively, wherein a first part of the output image data that corresponds to the first region in the photo-sensitive surface is to be generated according to the first colour pattern, and a second part of the output image data that corresponds to the second region in the photo-sensitive surface is to be generated according to the second colour pattern.

15. The method of claim 11, further comprising:

reading out, by the controller, the image data from the image sensor chip, by:

(i) selectively skipping reading out from those photo-sensitive cells in at least a region of the photo-sensitive surface that correspond to: at least one colour filter in at least one array of the first type of colour filters, at least one colour filter in at least one array of the second type of colour filters, and at least one colour filter in at least one array of the third type of colour filters, of a given physical smallest repeating unit; and (ii) reading out from those photo-sensitive cells in at least the region of the photo-sensitive surface that correspond to: remaining colour filters in the at least one array of the first type of colour filters, remaining colour filters in the at least one array of the second type of colour filters, and remaining colour filters in at least one array of the third type of colour filters, of the given physical smallest repeating unit; and providing, by the controller, said image data as an input to the at least one neural network.

* * * * *